US012775792B2

(12) United States Patent
Fukuda et al.

(10) Patent No.: US 12,775,792 B2
(45) Date of Patent: Oct. 27, 2026

(54) VALIDITY DETERMINATION APPARATUS, VALIDITY DETERMINATION METHOD, AND VALIDITY DETERMINATION PROGRAM

(71) Applicant: NTT, Inc., Tokyo (JP)

(72) Inventors: Nobukazu Fukuda, Musashino (JP); Chao Wu, Musashino (JP); Shingo Horiuchi, Musashino (JP); Hiroaki Kikushima, Musashino (JP); Kenichi Tayama, Musashino (JP)

(73) Assignee: NTT, Inc., Tokyo (JP)

( * ) Notice: Subject to any disclaimer, the term of this patent is extended or adjusted under 35 U.S.C. 154(b) by 142 days.

(21) Appl. No.: 18/730,804

(22) PCT Filed: Feb. 15, 2022

(86) PCT No.: PCT/JP2022/005792

§ 371 (c)(1),
(2) Date: Jul. 22, 2024

(87) PCT Pub. No.: WO2023/157047

PCT Pub. Date: Aug. 24, 2023

(65) Prior Publication Data

US 2025/0103804 A1 Mar. 27, 2025

(51) Int. Cl.
*G06F 40/226* (2020.01)
*G06F 40/253* (2020.01)
(Continued)

(52) U.S. Cl.
CPC .......... *G06F 40/226* (2020.01); *G06F 40/253* (2020.01); *G06F 40/284* (2020.01); *G06F 40/30* (2020.01)

(58) Field of Classification Search
CPC . G10L 15/22; G10L 15/063; G10L 2015/025; G10L 15/02; G10L 15/04;
(Continued)

(56) References Cited

U.S. PATENT DOCUMENTS 6,937,975 B1 * 8/2005 Elworthy ................ G06F 40/30 704/9
9,830,315 B1 * 11/2017 Xiao ...................... G06N 3/045
(Continued)

OTHER PUBLICATIONS

Arthur, P., Neubig, G., Sakti, S., Toda, T., & Nakamura, S. (2015). Semantic parsing of ambiguous input through paraphrasing and verification. Transactions of the Association for Computational Linguistics, 3, 571-584. (Year: 2015).*
(Continued)

*Primary Examiner* — Philip H Lam
(74) *Attorney, Agent, or Firm* — XSENSUS LLP

(57) ABSTRACT

A validity determination apparatus according to one embodiment includes: circuitry configured to acquire a natural sentence; output a semantic representation by executing semantic parsing with the natural sentence as an input; calculate a first alignment score representing a relationship between input/output tokens of the natural sentence and the semantic representation; calculate a second alignment score of a word unit from a relationship between a token included in the input/output tokens and a word; extract natural sentence content words by executing part-of-speech parsing on the natural sentence; a grammar parser configured to extract semantic representation content words by executing grammar parsing on the semantic representation; and determine whether the semantic representation is valid on the basis of the second alignment score, the natural sentence content words, and the semantic representation content words.

7 Claims, 9 Drawing Sheets

(51) Int. Cl.
*G06F 40/284* (2020.01)
*G06F 40/30* (2020.01)

(58) Field of Classification Search
CPC ......... G10L 15/06; G10L 15/16; G10L 15/18; G10L 15/1822; G10L 15/26; G06F 40/232; G06F 40/279; G06F 16/243; G06F 16/24; G06F 16/2457; G06F 16/24578; G06F 40/30; G06F 16/36; G06F 40/56; G06F 40/35
See application file for complete search history.

(56) References Cited

U.S. PATENT DOCUMENTS

| | | | | |
|---|---|---|---|---|
| 12,045,568 | B1 * | 7/2024 | Shrivastava | G10L 15/1815 |
| 2019/0392066 | A1 * | 12/2019 | Kim | G06F 16/24578 |
| 2021/0004443 | A1 * | 1/2021 | Sapugay | G06F 16/686 |
| 2021/0117624 | A1 * | 4/2021 | Aghajanyan | G06F 16/3329 |
| 2022/0284174 | A1 * | 9/2022 | Galitsky | G06F 40/30 |

OTHER PUBLICATIONS

Zhang et al., "Did You Ask a Good Question? A Cross-Domain Question Intention Classification Benchmark for Text-to-SQL", arXiv:2010.12634v1, Oct. 23, 2020, 8 pages.
Zeng et al., "Photon: A Robust Cross-Domain Text-to-SQL System", arXiv:2007.15280v2, Aug. 3, 2020, 12 pages.

* cited by examiner

Fig. 4

| | sepal |
|---|---|
| _Se | 0.103 |
| pal | 0.048 |

→

| | sepal |
|---|---|
| _Sepal | 0.151 |

Fig. 5

(a)

| | SELECT | COUNT | Species | FROM | table |
|---|---|---|---|---|---|
| name | 0.11 | 0.54 | 0.72 | 0.47 | 0.85 |
| the | 0.87 | 0.42 | 0.09 | 0.60 | 0.45 |
| number | 0.52 | 0.39 | 0.10 | 0.25 | 0.46 |
| of | 0.72 | 0.24 | 0.85 | 0.36 | 0.74 |
| species | 0.51 | 0.56 | 0.54 | 0.44 | 0.49 |

(b)

| | name | the | number | of | species |
|---|---|---|---|---|---|
| Species | 0.72 | 0.09 | 0.10 | 0.85 | 0.54 |

(c)

| | SELECT | COUNT | Species | FROM | table |
|---|---|---|---|---|---|
| number | 0.52 | 0.39 | 0.10 | 0.25 | 0.46 |
| species | 0.51 | 0.56 | 0.54 | 0.44 | 0.49 |

Fig. 7 number → COUNT PHRASE CONVERSION HAS BEEN PERFORMED (a)

| | SELECT | COUNT | Species | FROM | table | WHERE | Sepal | width | = | 3.4 | AND | Sepal | length | = | 5.4 |
|---|---|---|---|---|---|---|---|---|---|---|---|---|---|---|---|
| number | 0.01 | 0.83 | 0.03 | 0.01 | 0.02 | 0.02 | 0.01 | 0.01 | 0.01 | 0.01 | 0.01 | 0.01 | 0.01 | 0.01 | 0.01 |
| species | 0.00 | 0.00 | 1.00 | 0.00 | 0.00 | 0.00 | 0.00 | 0.00 | 0.00 | 0.00 | 0.00 | 0.00 | 0.00 | 0.00 | 0.00 |
| width | 0.00 | 0.00 | 0.00 | 0.00 | 0.00 | 0.00 | 0.00 | 0.99 | 0.00 | 0.00 | 0.00 | 0.00 | 0.00 | 0.00 | 0.00 |
| length | 0.00 | 0.00 | 0.00 | 0.00 | 0.01 | 0.01 | 0.03 | 0.20 | 0.00 | 0.00 | 0.00 | 0.03 | 0.71 | 0.01 | 0.00 |

(b)

| | Species | Sepal | width | Sepal |
|---|---|---|---|---|
| name | 0.00 | 0.00 | 0.00 | 0.00 |
| the | 0.00 | 0.00 | 0.00 | 0.00 |
| number | 0.00 | 0.00 | 0.00 | 0.00 |
| of | 0.00 | 0.00 | 0.00 | 0.00 |
| species | 1.00 | 0.00 | 0.00 | 0.00 |
| with | 0.00 | 0.00 | 0.00 | 0.00 |
| sepal | 0.00 | 0.98 | 0.12 | 0.02 |
| width | 0.00 | 0.00 | 0.84 | 0.00 |
| of | 0.00 | 0.00 | 0.00 | 0.00 |
| 3.4 | 0.00 | 0.00 | 0.00 | 0.00 |
| and | 0.00 | 0.00 | 0.00 | 0.00 |
| sepal | 0.00 | 0.02 | 0.00 | 0.97 |
| length | 0.00 | 0.00 | 0.03 | 0.00 |
| of | 0.00 | 0.00 | 0.00 | 0.00 |
| 5.4 | 0.00 | 0.00 | 0.00 | 0.00 |

Fig. 9

(a)

| | SELECT | Hometown | FROM | table | WHERE | School | = | Saint | Joseph | Regional | High | School |
|---|---|---|---|---|---|---|---|---|---|---|---|---|
| hometown | 0 | 0.99 | 0 | 0 | 0 | 0 | 0 | 0 | 0 | 0 | 0 | 0 |
| pitcher | 0.04 | 0.23 | 0.07 | 0.08 | 0.1 | 0.04 | 0.05 | 0.07 | 0.07 | 0.08 | 0.08 | 0.08 |
| school | 0.04 | 0.03 | 0.04 | 0.05 | 0.31 | 0.23 | 0.06 | 0.02 | 0.05 | 0.04 | 0.06 | 0.07 |
| Saint | 0 | 0 | 0 | 0 | 0 | 0 | 0 | 1 | 0 | 0 | 0 | 0 |
| Joseph | 0 | 0 | 0 | 0 | 0 | 0 | 0 | 0.21 | 0.77 | 0.01 | 0 | 0 |
| Regional | 0 | 0 | [illegible] | [illegible] | [illegible] | [illegible] | 0 | 0 | 0 | 0.9 | 0.09 | 0 |
| High | 0 | 0 | [illegible] | [illegible] | [illegible] | [illegible] | 0 | 0 | 0 | 0.9 | 0.09 | 0 |
| School | 0 | 0.01 | 0.01 | 0.01 | 0.02 | 0.02 | 0.01 | 0 | 0.01 | 0.02 | 0.03 | 0.87 |

INFORMATION ON pitcher IS MISSING (b)

| | Hometown | School | Saint | Joseph | Regional | High | School |
|---|---|---|---|---|---|---|---|
| What | 0 | 0.01 | 0 | 0 | 0 | 0 | 0 |
| is | 0 | 0.01 | 0 | 0 | 0 | 0 | 0 |
| the | 0 | 0.01 | 0 | 0 | 0 | 0 | 0 |
| hometown | 0.67 | 0.01 | 0 | 0 | 0 | 0 | 0 |
| of | 0.25 | 0.01 | 0 | 0 | 0 | 0 | 0 |
| the | 0 | 0.01 | 0 | 0 | 0 | 0 | 0 |
| pitcher | 0 | 0.01 | 0 | 0 | 0 | 0 | 0 |
| whose | 0 | 0.13 | 0 | 0 | 0 | 0.01 | 0 |
| school | 0 | 0.1 | 0 | 0 | 0 | 0.01 | 0 |
| was | 0 | 0.07 | 0 | 0 | 0 | 0.01 | 0 |
| Saint | 0 | 0.01 | 1 | 0.01 | 0 | 0 | 0 |
| Joseph | 0 | 0.01 | 0 | 0.79 | 0 | 0 | 0 |
| Regional | 0 | 0.03 | 0 | 0 | 0.49 | 0.35 | 0 |
| High | 0 | 0.03 | 0 | 0 | 0.49 | 0.35 | 0 |
| School | 0 | 0.05 | 0 | 0 | 0 | 0.02 | 0.08 |
| ? | 0.06 | 0.52 | 0 | 0.18 | 0 | 0.22 | 0.91 |

VALIDITY DETERMINATION APPARATUS, VALIDITY DETERMINATION METHOD, AND VALIDITY DETERMINATION PROGRAM

CROSS-REFERENCE TO RELATED APPLICATION

This application is a national stage application, pursuant to 35 U.S.C. § 371, of International Patent Application No. PCT/JP2022/005792, filed Feb. 15, 2022, the entire contents of which are incorporated herein by reference.

TECHNICAL FIELD

The present invention relates to a validity determination apparatus, a validity determination method, and a validity determination program.

BACKGROUND ART

Conventionally, in the case of determining the possibility of an answer to an input to a semantic parsing model, it is necessary for a validity determination apparatus to prepare a data set for determining the possibility of the answer separately from a data set for semantic parsing and the model, and it is necessary to design and train the model.

For example, in NPL 1, a technique for distinguishing four kinds of unanswerable questions has been proposed in order to classify the intention of a question sentence. In addition, in NPL 2, for example, a technique has been proposed in which a semantic parser detects an unanswerable question and an unclear portion and proposes a paraphrase.

CITATION LIST

Non Patent Literature

[NPL 1] Zhang, Yusen et al. "Did You Ask a Good Question? A Cross-Domain Question Intention Classification Benchmark for Text-to-SQL." ArXiv abs/2010 12634 (2020)

[NPL 2] Zeng, Jichuan et al. "Photon: A Robust Cross-Domain Text-to-SQL System." ACE (2020).

SUMMARY OF INVENTION

Technical Problem

In both techniques proposed in NPL 1 and NPL 2, there is a problem that it is necessary to create a data set and to design and train another model in addition to the semantic parser.

Further, since an answer possibility model has different accuracy and behavior as compared with a semantic parsing model, there is a problem that possibility of an answer is not consistent with semantic parsing.

Further, it is desired to control and analyze a target system such as a network/server resources from a natural sentence (hereinafter simply referred to as NL). That is, it is desired to generate an appropriate semantic representation (hereinafter simply referred to as MR) from an NL and apply it to a target system. However, an MR generated from an NL may not necessarily be in accordance with a target system, or may cause the target system to perform an unintended operation by executing an inappropriate MR. Accordingly, there is a risk of executing a generated MR as it is. Therefore, it is desired to determine whether a program can be applied to a target system, that is, whether it is valid.

The present invention has been made in view of the above circumstances, and it is an object of the present invention to provide a technique by which it is possible to determine the validity of an output result from the corresponding relationship between an input and an output of a trained semantic parsing model without creating a special data set or designing and training the model.

Solution to Problem

To accomplish the aforementioned object, one aspect of the present invention is a validity determination apparatus including: a data acquisition unit configured to acquire a natural sentence; a semantic parser configured to output a semantic representation by executing semantic parsing with the natural sentence as an input; an alignment score calculation unit configured to calculate a first alignment score representing a relationship between input/output tokens of the natural sentence and the semantic representation; a score correction unit configured to calculate a second alignment score of a word unit from a relationship between a token included in the input/output tokens and a word; a part-of-speech parser configured to extract natural sentence content words by executing part-of-speech parsing on the natural sentence; a grammar parser configured to extract semantic representation content words by executing grammar parsing on the semantic representation; and a validity determination unit configured to determine whether the semantic representation is valid on the basis of the second alignment score, the natural sentence content words, and the semantic representation content words.

Advantageous Effects of Invention

According to one aspect of the present invention, the validity determination apparatus can determine the validity of an output result from the corresponding relationship between an input and an output using a trained model.

BRIEF DESCRIPTION OF DRAWINGS

FIG. 4 is a diagram illustrating an example of token and word alignment scores.

FIG. 5 is a diagram illustrating an example of an alignment score to be extracted.

FIG. 7 is a diagram illustrating some alignment scores for each content word calculated by an MR validity determination unit.

FIG. 9 is a diagram illustrating some of alignment scores for each content word calculated by an MR validity determination unit.

DESCRIPTION OF EMBODIMENTS

Hereinafter, embodiments according to the present invention will be described with reference to the drawings. Elements that are the same as or similar to elements that have already been described are denoted by the same or similar reference signs, and repeated description will be basically omitted.

EMBODIMENT

Configuration

Figure 1:
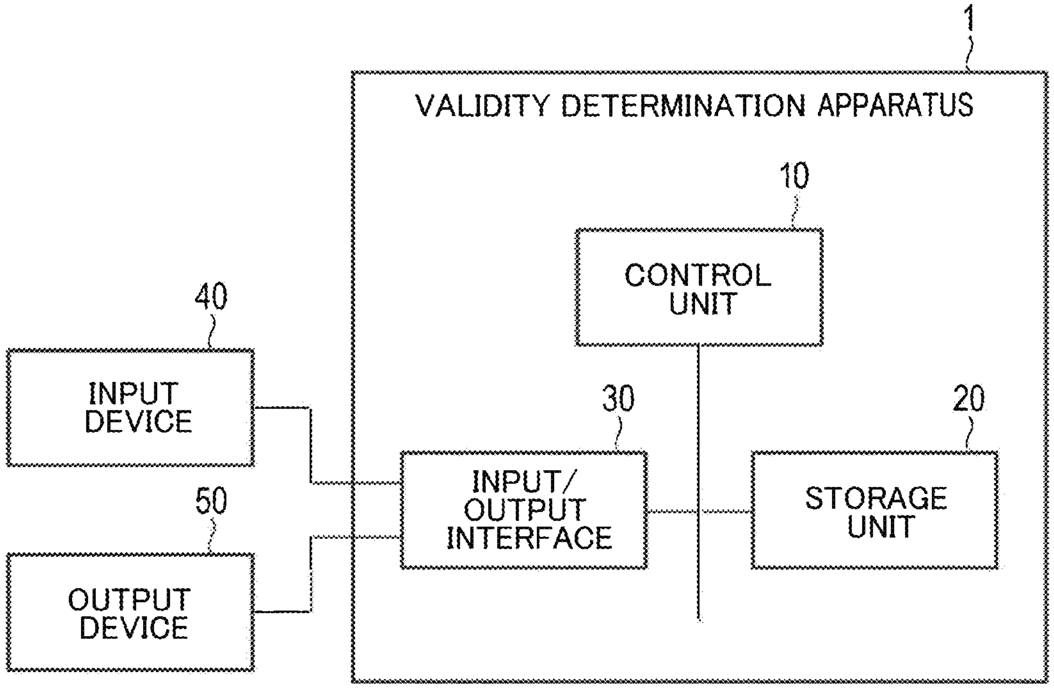
FIG. 1 is a block diagram illustrating an example of a hardware configuration of a validity determination apparatus according to an embodiment.

FIG. 1 is a block diagram illustrating an example of a hardware configuration of a validity determination apparatus 1 according to an embodiment.

The validity determination apparatus 1 may be, for example, a user terminal used by a user, Here, a user terminal may be any computer that can be generally used by a user, such as a personal computer (PC), a smartphone, a tablet terminal, or a wearable terminal. Further, the validity determination apparatus 1 may be a server to which a user terminal is connected via a network. In addition, a server may be any computer that can be used as a server.

The validity determination apparatus 1 includes a control unit 10, a storage unit 20, and an input/output interface 30, The control unit 10, the storage unit 20, and the input/output interface 30 are connected to each other via a bus such that they can communicate. Further, the input/output interface 30 is connected to an input device and an output device 50 such that it can communicate with the input device 40 and the output device 50.

The control unit 10 controls the validity determination apparatus 1. The control unit 10 includes a hardware processor such as a central processing unit (CPU).

The storage unit 20 is configured by combining, for example, a non-volatile memory to/from which writing/reading can be performed at any time, such as a solid state drive (SSD) as a storage medium, and a non-volatile memory such as a read only memory (ROM), and stores application programs necessary to execute various types of control processing according to one embodiment in addition to middleware such as an operating system (OS). Hereinafter, the OS and each application program are collectively referred to as a program. The storage unit 20 may further include a storage medium that is a combination of a non-volatile memory to/from which writing/reading can be performed at any time, such as an SSD, and a volatile memory such as a random access memory (RAM).

The input/output interface 30 is connected to the input device 40, the output device 50, and the like. The input/output interface 30 is an interface that allows information to be transmitted and received between the input device 40 and the output device 50. The input/output interface 30 may include a communication interface. For example, the validity determination apparatus 1 and at least one of the input device 40 and the output device 50 may be wirelessly connected using a short-range radio technology or the like, and may perform transmission and reception of information using the short-range radio technology. Further, the communication interface may include, for example, a communication module that makes a wired or wireless connection to a apparatus ox server used by another user via a network.

The input device 40 includes, for example, a keyboard, a pointing device, or the like for an owner (e.g., a user or the like) of the validity determination apparatus 1 to input various types of information including data and the like. Further, the input device 40 may include a reader for reading data to be stored in the storage unit 20 from a memory medium such as a USB memory, and a disk device for reading such data from a disk medium.

The output device 50 includes a display for displaying output data to be presented to the user from the validity determination apparatus 1, a printer for printing the output data, and the like.

Figure 2:
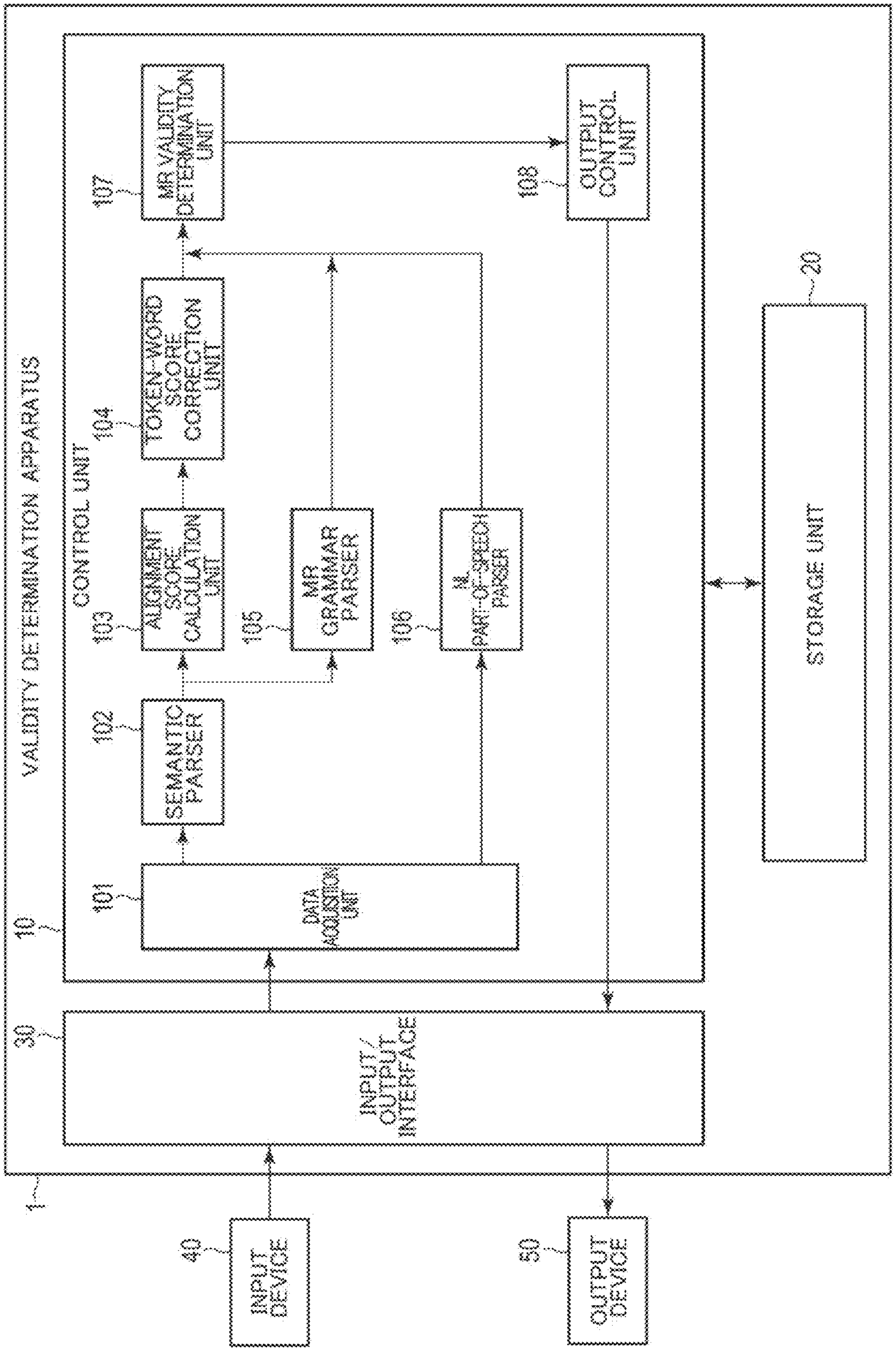
FIG. 2 is a block diagram illustrating a software configuration of the validity determination apparatus in an embodiment in association with the hardware configuration illustrated in FIG. 1.

FIG. 2 is a block diagram illustrating a software configuration of the validity determination apparatus 1 in an embodiment in association with the hardware configuration illustrated in FIG. 1.

The control unit 10 includes a data acquisition unit 101, a semantic parser 102, an alignment score calculation unit. 103, a token-word score correction unit 104, a semantic representation (MR) grammar parser 105, a natural sentence (NL) part-of-speech parser 106, an MR validity determination unit 107, and an output control unit 108.

The data acquisition unit 101 acquires various types of data from the input device 40 via the input/output interface 30. For example, the data acquisition unit 101 acquires a natural sentence, that is, NL. For example, the NL may be any natural sentence such as an utterance, a query, or a question. Further, the data acquisition unit 101 outputs the acquired NL to the semantic parser 102 and the NL part-of-speech parser 106.

The semantic parser 102 may be a general one that has been trained. Therefore, the semantic parser 102 has already trained a model in advance, and does not need to train the model. The semantic parser 102 can output a semantic representation (MR) using the trained model in a case in which an NL is input. Here, an MR may be any semantic representation such as grammar, ASDL, SQL, and the like. Here, an MR is a semantic representation described in accordance with a structural grammar in contrast to an NL. For example, an MR output from the semantic parser 102 may be a program. Then, the semantic parser 102 outputs the model used by the alignment score calculation unit 103 and outputs the MR to the MR grammar parser 105. A general trained semantic parser 102 outputs text in a token unit obtained by dividing a word into finer units.

The alignment score calculation unit 103 calculates an alignment score representing a relationship between input/output tokens of the NL and the MR. For example, the alignment score calculation unit 103 may calculate alignment scores of input/output tokens of the model using an existing method. The existing method may be, for example, a method disclosed in Literature 1 (Lundberg, Scott M. and Su-in Lee. "A Unified Approach to Interpreting Model Predictions." NIPS (2017)), Literature 2 (Chen, Yun et al. "Accurate Word Alignment Induction from Neural Machine Translation." EMNLP (2020)), or the like. For example, Literature 1 discloses that alignment can be calculated from a shapley value, and Literature 2 discloses that alignment can be calculated from an attention weight of a transformer. The alignment score calculation unit 103 may calculate an alignment score according to the method described in Literature 1, for example. Then, the alignment score calculation unit 103 outputs the calculated alignment score to the token-word score correction unit 104. The alignment score calculation unit 103 calculates an alignment score for the output of the semantic parser 102. Therefore, if the output of the semantic parser 102 is a token unit, the alignment score calculation unit 103 calculates an alignment score for each token. In validity determination in the MR validity determination unit 107 which will be described later, processing is performed in a word unit, and thus it is necessary to correct an alignment score calculated in a token unit by the token-word score correction unit 104 in a word unit.

The token-word score correction unit 104 calculates an alignment score between words from the corresponding relationship between input/output tokens and the words. For example, the token-word score correction unit 104 calculates an alignment score in a word unit by adding up scores at the time of combining tokens into a word. Then, the token-word score correction unit 104 outputs the alignment score in a word unit to the MR validity determination unit 107.

The MR grammar parser 105 performs grammar parsing of the MR received from the semantic parser 102 according to a general grammar parsing method, and extracts MR content words. Then, the MR grammar parser 105 outputs the extracted MR content words to the ME validity determination unit 107.

The NL part-of-speech parser 106 parses the part of speech of the NL received from the data acquisition unit 101 according to a general NL part-of-speech parsing, and extracts NL content words. Then, the NL part-of-speech parser 106 outputs the extracted NL content words to the MR validity determination unit 107.

The MR validity determination unit 107 determines the validity of the MR on the basis of the received alignment score, MR content words, and NL content words. Details of a validity determination method will be described later.

Then, the MR validity determination unit 107 outputs the determination result to the output control unit 108.

The output control unit. 108 outputs the determination result to the output device so through the input/output interface 30.

Operation

Figure 3:
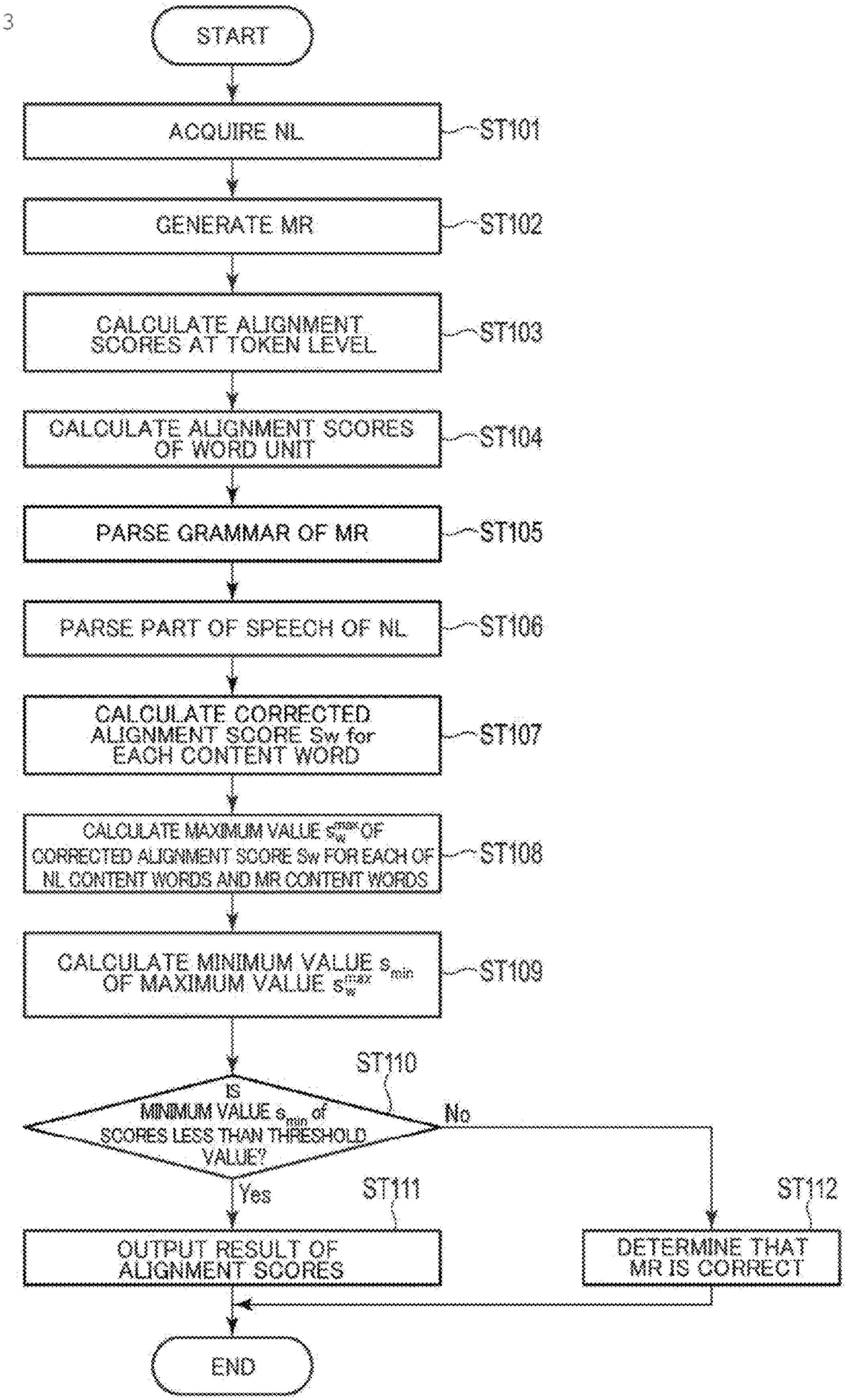
FIG. 3 is a flowchart illustrating an example of an operation for determining an MR validity by the validity determination apparatus.

FIG. 3 is a flowchart illustrating an example of an operation for determining an MR validity by the validity determination apparatus 1.

The control unit 10 of the validity determination apparatus 1 realizes the operation of this flowchart by reading and executing a program stored in the storage unit 20.

The operation is started when the input device 40 receives a natural sentence (NL). The NL may be directly input to the input device 40 by the user of the validity determination apparatus 1, may be an existing data set, or may be generated by an arbitrary program.

The data acquisition unit 101 acquires the NL from the input device 40 via the input/output interface 30 (step ST101). The data acquisition unit 101 outputs the acquired NL co the semantic parser 102 and the NL part-of-speech parser 106.

The semantic parser 102 generates MRs from the NL (step ST102). The semantic parser 102 generates MRs from the ND using a trained model. Then, the semantic parser 102 outputs the generated MRs to the MR grammar parser 105, and outputs the model used to the alignment score calculation unit 103.

The alignment score calculation unit 103 calculates alignment score at a token level (step ST103). The alignment score calculation unit 103 calculates alignment scores of input/output tokens of the model received from the semantic parser 102, For example, the alignment score calculation unit 103 calculates alignment scores from shapley values according to the method disclosed in the above-mentioned Literature 1 (hereinafter simply referred to as "shap"). The shap is a method based on shapley values of a game theory in order to describe the output of a model. Here, a shapley value is, for example, a value that has an influence on the output in a case in which a feature amount participates or does not participate in a model, and a value indicating a variation amount of a predicted value from an average predicted value when a certain feature amount has participated. For example, at the time of performing calculation using shap, the alignment score calculation unit 103 needs to refer to a change in logit of tokens at the time of masking input tokens in addition to input and output of the NL and the MRs. The alignment score calculation unit 103 outputs the calculated alignment scores to the token-word score correction unit 104.

The token-word score correction unit 104 calculates alignment scores in word units (step ST104). The token-word so correction unit 104 calculates an alignment score between words from the corresponding relationship between tokens and the words. Here, the corresponding relationship between the tokens and the words is obtained by comparing respective character strings from the head. For example, when a token is combined with a word, alignment scores are added to each other to obtain an alignment score for each word. The token-word score correction unit 104 outputs the calculated alignment score between words to the MR validity determination unit 107.

FIG. 4 is a diagram illustrating an example of token and word alignment scores.

As illustrated in FIG. 4, in a case in which a score of a first token (_Se) with respect to a word "sepa1" is 0.103, and a score of a second token (pa1) is 0.048, when the first token and the second token are combined into the word (sepa1), 0.151 obtained by adding up the scores of the tokens is an alignment score of the word unit.

The MR grammar parser 105 parses the grammar of the MRS (step ST105). The MR grammar parser 105 parses the grammar of the MRs according to a grammar parsing method for each MR to extract MR content words. Here, a method of parsing the grammar of the MRS to extract the MR content words may be a general method, and detailed description thereof will be omitted. Then, the MR grammar parser 105 outputs the extracted MR content words to the MR validity determination unit 107.

The NL part-of-speech parser 106 parses the part of speech of the NL (step ST106). The NL part-of-speech parser 106 parses the part of speech of the NL and extracts NL content words. Here, a method of parsing the part of speech of the NL to extract the NL content words may be a general method, and detailed description thereof will be omitted. Then, the NL part-of-speech parser 106 outputs the extracted NI content words to the MR validity determination unit 107.

The MR validity determination unit 107 calculates a corrected alignment score $s_w$ for each content word (step ST107). First, the MR validity determination unit 107 extracts content words for the NL and each MR on the basis of the received MR content words and NL content words, and extracts an alignment score for the other series.

FIG. 5 is a diagram illustrating an example of an alignment score to be extracted.

In the table shown in (a) of FIG. 5, the label of the row indicates some content words included in NL content words, and the label of the column indicates some content words included in MR content words. In addition, each value is an alignment score calculated by the alignment score calculation unit 103. (b) of FIG. 5 shows alignment scores of "name," "the," "number," "of," and "species" which are some of the NI content words in the case of an MR content word of "Species." In addition, (c) of FIG. 5 shows alignment scores of MR content words of "SELECT," "COUNT," "Species," "FROM," and "table" in the case of NI content words of "number" and "species."

Next, the MR validity determination unit 107 calculates a corrected alignment score $s_w$ for each content word using softmax from extracted alignment scores. Here, w represents each content word.

The MR validity determination unit 107 calculates a maximum value $s^{max}{}_w$ of the alignment score &, corrected for each NL content word and each MR content word (step ST108). For example, the maximum value $s^{max}{}_w$ indicates the corresponding relationship between contents words.

The MR validity determination unit 107 calculates a minimum value $s_{min}$ of the maximum value $s^{max}{}_w$ (step ST109). Here, the minimum value $s_{min}$ is calculated by the following expression.

$$s_{min} = \min_w s_w^{max} \quad \text{[Math. 1]}$$

The minimum value $s_{min}$ of a score indicates that the smaller the value, the lower a degree of correspondence to a content word to which the content word corresponds most. That is, the fact that the minimum value $s_{min}$ of a score is small means that information on the corresponding content word is missing.

The MR validity determination unit 107 determines whether or not the minimum value $s_{min}$ of the scores is less than a threshold valve (step ST110). The MR validity determination unit. 107 determines the validity of the MRS on the basis of the minimum value $s_{min}$. Upon determining that the minimum value Sais of the scores is less than the threshold value, the MR validity determination unit 107 determines that the MRs are not correct, and outputs the result of the alignment scores to the output control unit 108. Then, processing proceeds to step ST111. On the other hand, upon determining that the scores are equal to or greater than the threshold value, processing proceeds to step ST112.

The output control unit 108 outputs the result of the alignment scores to the output device 50 via the input/output interface 30 (step ST111). The output device 50 that has received the result of the alignment scores may display the result of the alignment scores. Further, the output device so may also output MRs output by the semantic parser 102 to the output device 50.

The MR validity determination unit 107 determines that MRs axe correct (step ST112). The MR validity determination unit 107 may output information indicating that the MRs are correct to the output control unit 108. The output control unit 108 outputs the information indicating that MRs are correct to the output device 50 through the input/output interface 30. Further, the output control unit 108 may output the alignment scores calculated by the MR validity determination unit 107 to the output device 50. The output device 50 that has received the information may display the information.

Example

In the following description, an example will be described. First, WikiSQL is used as an input data set. The data set is a data set of Semantic Paring annotated by a cloud source. Further, a task of estimating the corresponding SQL from a natural language question (NL) is assumed.

Next, the model used in the semantic parser 102 uses t5-base-finetuned-wikiSQL. This model is a public model which has been trained in advance. Further, it is assumed that only inference is executed without performing new training using this model.

The alignment score calculation unit 103 uses the shap. For example, the alignment score calculation unit 103 calculates a shapley value of an input token to a logit of an output token.

As the MR grammar parser 105, sqlparser is used. Here, since the sqlparser used as the MR grammar parser 105 may be a general library implemented by Python or the like, for example, detailed description thereof will be omitted.

SpaCy is used as the NL part-of-speech parser 106. Here, since SpaCy used as the NL part-of-speech parser 106 may be a general library implemented by Python or the like, detailed description thereof will be omitted.

Figure 6:
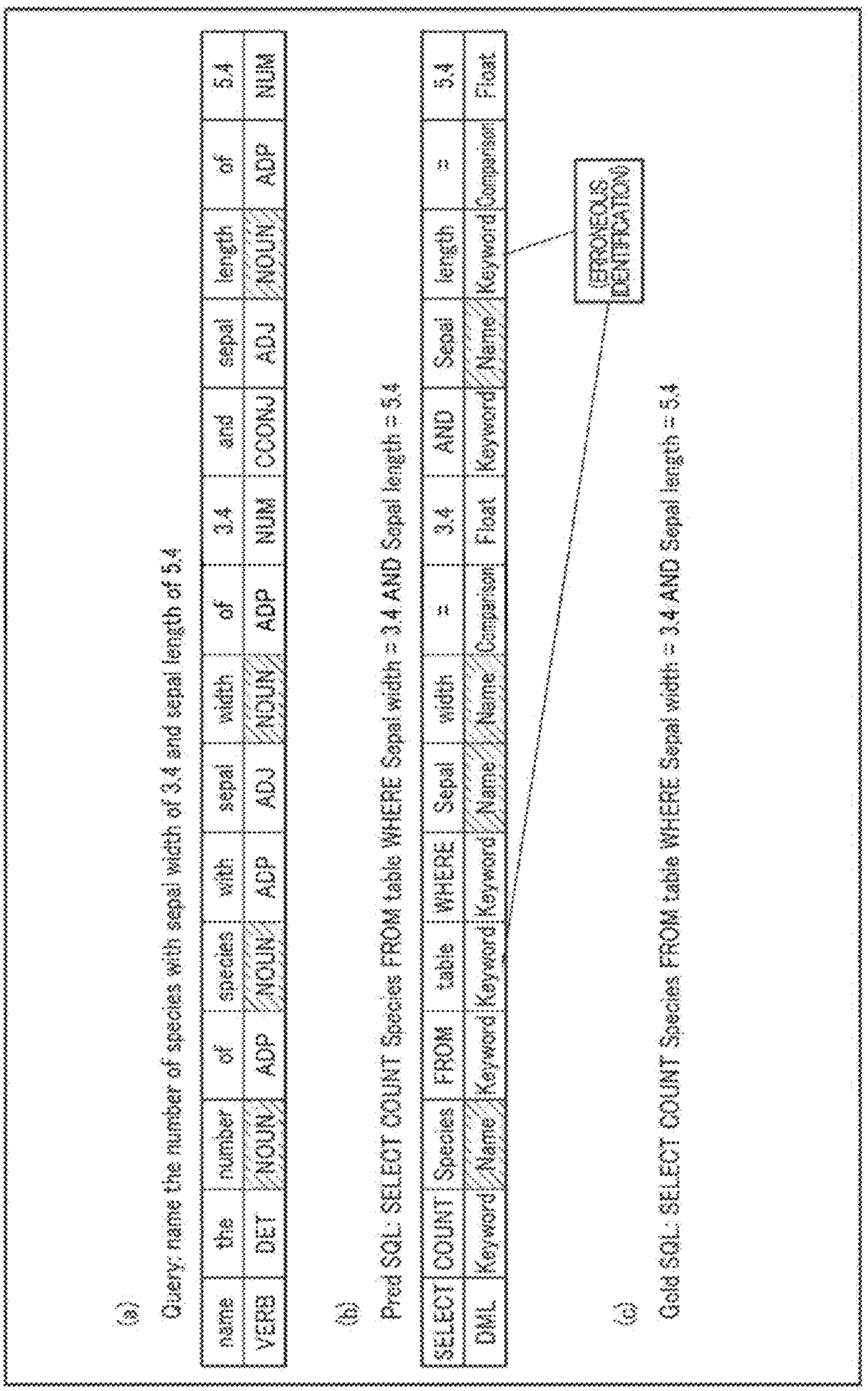
FIG. 6 is a diagram illustrating an example of an SQL estimated from a query and a correct answer SQL.

FIG. 6 is a diagram illustrating an example of an SQL estimated from a query and a correct answer SQL.

(a) of FIG. 6 shows an example of a query and an example of a parsing result of the NL part-of-speech parser 106. As illustrated in (a) of FIG. 6, "name of number of species with sepal width of 3.4 and sepal length of 5.4" is input as a query. Further, the NL part-of-speech parser 106 parses each part of speech of the query as shown in the table.

Next, (b) of FIG. 6 shows an example of an estimated SQL, that is, an MR and a parsing result of the MR grammar parser 105. Further, (c) of FIG. 6 shows a correct answer SQL. As shown in (b) of FIG. 6, the estimated SQL is the same as the correct answer SQL in (c) of FIG. 6. That is, in the example shown in FIG. 6, it is shown that contents words of the NL and the SQL correspond to each other in a one-to-one manner. On the other hand, it is shown that "table" and "length" in the parsing result of the MR grammar parser 105 are erroneously identified.

In the present application, the validity determination apparatus 1 performs processing in a pipeline manner by combining a plurality of methods. Therefore, an error in the previous stage may affect the subsequent stage. In the example shown in FIG. 6, the MR grammar parser 105 overlooks "length" and cannot evaluate the corresponding relationship from the content words of the SQL. However, it is possible to associate "length" that has been overlooked by the MR grammar parser 105 with "length" obtained from the parsing result of the NL part-of-speech parser 106, and thus there is no problem and the estimated SQL is the same as the correct answer SQL.

FIG. 7 is a diagram illustrating some of alignment scores for each content word calculated by the MR validity determination unit 107.

As illustrated in FIG. 7, it is shown that number→Count phrase conversion has been performed. Further, in the example of FIG. 7, it is shown that the corresponding relationship between an input NL and an output SQL can be correctly ascertained.

Figure 8:
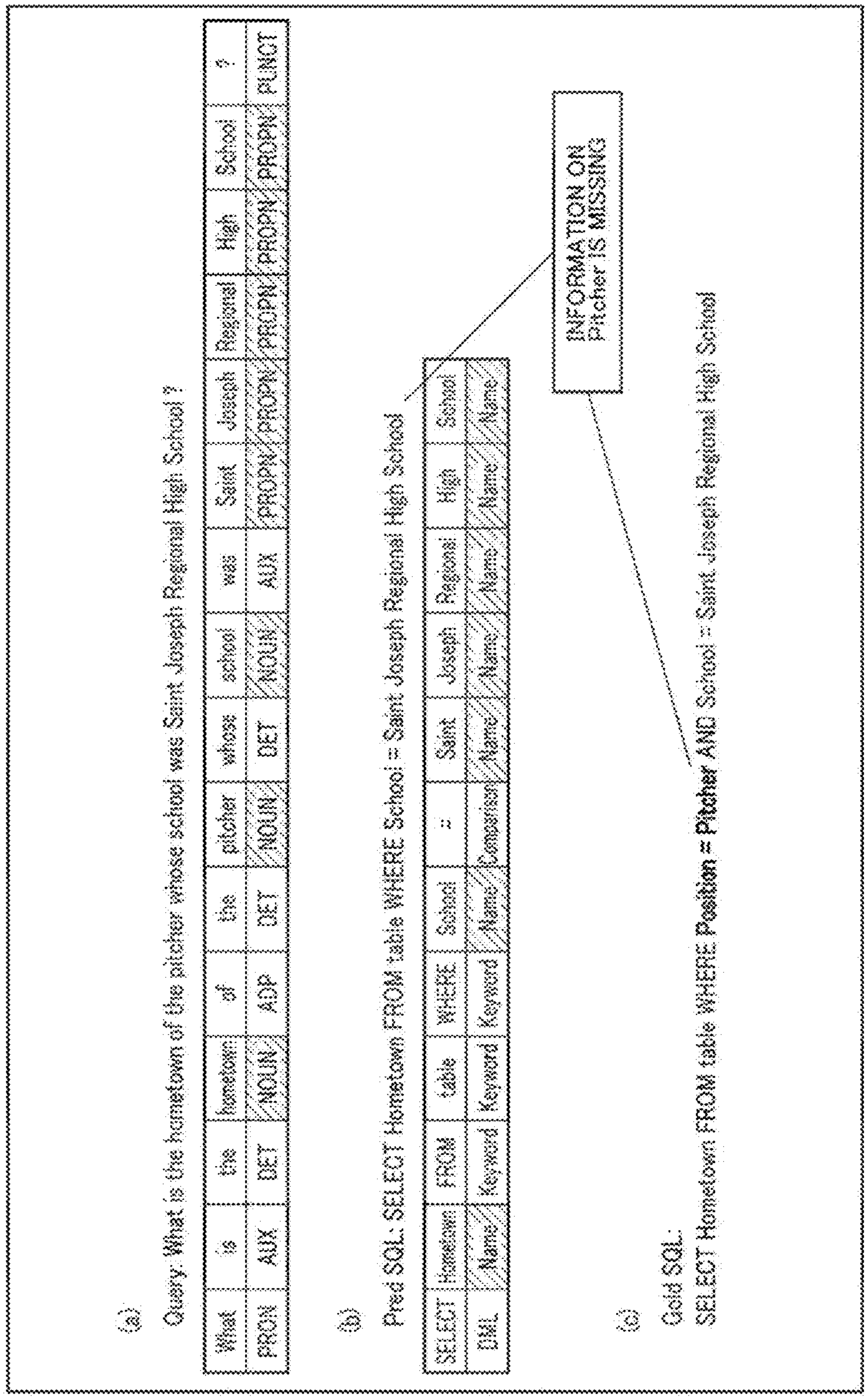
FIG. 8 is a diagram illustrating an example of an SQL estimated from a query and a correct answer SQL.

FIG. 8 is a diagram illustrating an example of an SQL estimated from a query and a correct answer SQL.

(a) of FIG. 8 shows an example of a query and an example of a parsing result of the NL part-of-speech parser 106. As shown in (a) of FIG. 8, "What is the hometown of the pitcher whose school was Saint Joseph Regional High School?" is input as a query. Further, the NE part-of-speech parser 106 parses each part of speech of the query as shown in the table.

Next, (b) of FIG. 8 shows an example of an estimated SQL, that is, an output result and a parsing result of the MR grammar parser 105. Further, (c) of FIG. 8 shows a correct answer SQL. As shown in (b) of FIG. 8, the estimated SQL does not match the correct answer SQL shown in (c) of FIG. 6, information on "Pitcher" is missing.

FIG. 9 is a diagram illustrating some of alignment scores for each content word calculated by the MR validity determination unit 107.

As shown in FIG. 9, information on "pitcher" is missing. As shown in FIG. 9, the corresponding relationship between the NL and the SOL is ascertained from the alignment scores. Further, It can be ascertained that there is a lack of correspondence between content words of the NL and SQL, leading to an incorrect answer.

(Effects)

According to the embodiment, the validity determination apparatus 1 need not create a data set and design and train a model. Further, the validity determination apparatus 1 can determine the possibility of an answer consistent with the behavior of a semantic parsing model. Further, the validity determination apparatus 1 can determine the validity of an output result from the corresponding relationship between an input and an output using a trained model.

Other Embodiments

Although an example in which the validity determination apparatus 1 uses a disclosed model has been illustrated in the above-described embodiment, a trained model created by a user themselves may be used.

Further, a scheme described in the embodiments can be stored as a program (software means) that can be executed by a computer in, for example, the storage medium such as a magnetic disk (a floppy (registered trademark) disk, hard disk, or the like), an optical disc (a CD-ROM, DVD, MO, or the like), a semiconductor memory (a ROM, RAM, flash memory, or the like), or transmitted and distributed via a communication medium. The program stored in the medium also includes a setting program for constructing, within the computer, software means (including not only execution programs but also tables and data structures) to be executed by the computer. A computer that realizes the present apparatus reads the program stored in the storage medium, constructs software means using the setting program in some cases, and executes the above-described processing by the software means controlling an operation. Note that storage media as referred to in the present specification are not limited to storage media for distribution and include storage media such as a magnetic disk or a semiconductor memory provided in a computer or in a device connected via a network.

In short, the present invention is not limited to the embodiment described above and can be variously modified in an implementation stage without departing from the spirit and scope of the invention. In addition, embodiments may be appropriately combined to the greatest extent feasible and, in such a case, combined effects are produced. Furthermore, the embodiment described above includes inventions in various stages, and various inventions may be extracted through appropriate combinations of the plurality of disclosed constituent elements.

REFERENCE SIGNS LIST

1 Validity determination apparatus
10 Control unit
101 Data acquisition unit
102 Semantic parser
103 Alignment score calculation unit
104 Token-word score correction unit
105 MR grammar parser
106 NL part-of-speech parser
107 MR validity determination unit
108 Output control unit
20 Storage unit
30 Input/output interface
40 Input device
50 Output device

The invention claimed is:

1. A validity determination apparatus comprising:
processing circuitry configured to:
acquire a natural sentence;
output a semantic representation by executing semantic parsing with the natural sentence as an input;
calculate a first alignment score representing a relationship between input/output tokens of the natural sentence and the semantic representation;
calculate a second alignment score of a word unit of the natural sentence from a relationship between a token included in the input/output tokens and a word of the natural sentence;
extract natural sentence content words into a first group by executing part-of- speech parsing on the natural sentence;
extract semantic representation content words into a second group by executing grammar parsing on the semantic representation;
determine whether the semantic representation is valid based on a combination of the second alignment score, the natural sentence content words extracted by the part-of-speech parsing and the semantic representation content words extracted by the grammar parsing;
calculate a third alignment score between the first group and the second group; and
calculate a corrected third alignment score for each content word based on the third alignment score.

2. The validity determination apparatus according to claim 1, wherein the processing circuitry is further configured to calculate a maximum value of the corrected alignment score for each of the natural sentence content words and the semantic representation content words.

3. The validity determination apparatus according to claim 2, wherein the processing circuitry is further configured to:
calculate a minimum value of the maximum value from the corrected alignment score of the content words, and
determine whether the minimum value is less than a threshold value.

4. The validity determination apparatus according to claim 3, wherein the processing circuitry is further configured to output the third alignment score in a case in which it is determined that the minimum value is less than the threshold value.

5. The validity determination apparatus according to claim 3, wherein the processing circuitry is further configured to determine that the semantic representation is valid in a case in which it is determined that the minimum value is equal to or greater than the threshold value.

6. A validity determination method comprising:
acquiring a natural sentence;
outputting a semantic representation by executing semantic parsing with the natural sentence as an input;

calculating a first alignment score representing a relationship between input/output tokens of the natural sentence and the semantic representation;

calculating a second alignment score of a word unit of the natural sentence from a relationship between a token included in the input/output tokens and a word of the natural sentence;

extracting natural sentence content words into a first group by executing part-of-speech parsing on the natural sentence;

extracting semantic representation content words into a second group by executing grammar parsing on the semantic representations;

determining whether the semantic representation is valid based on a combination of the second alignment score, the natural sentence content words extracted by the part-of-speech parsing and the semantic representation content words extracted by the grammar parsing;

calculating a third alignment score between the first group and the second group; and calculating a corrected third alignment score for each content word based on the third alignment score.

7. A non-transitory computer readable storage medium storing computer executable instructions which, when executed by processing circuitry of a validity determination apparatus, cause the processing circuitry to perform a process comprising:

acquiring a natural sentence;

outputting a semantic representation by executing semantic parsing with the natural sentence as an input;

calculating a first alignment score representing a relationship between input/output tokens of the natural sentence and the semantic representation;

calculating a second alignment score of a word unit of the natural sentence from a relationship between a token included in the input/output tokens and a word of the natural sentence;

extracting natural sentence content words into a first group by executing part-of-speech parsing on the natural sentence;

extracting semantic representation content words into a second group by executing grammar parsing on the semantic representations;

determining whether the semantic representation is valid based on a combination of the second alignment score, the natural sentence content words extracted by the part-of-speech parsing and the semantic representation content words extracted by the grammar parsing;

calculating a third alignment score between the first group and the second group; and calculating a corrected third alignment score for each content word based on the third alignment score.

* * * * *